United States Patent
Tresser et al.

(10) Patent No.: US 6,804,373 B1
(45) Date of Patent: Oct. 12, 2004

(54) METHOD AND SYSTEM USING RENORMALIZED PIXELS FOR PUBLIC KEY AND COMPRESSED IMAGES WATERMARKS ON PRINTS

(75) Inventors: Charles Philippe Tresser, Mamaroneck, NY (US); Jean-Marc Gambaudo, Genlis (FR)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 09/593,445

(22) Filed: Jun. 15, 2000

(51) Int. Cl.[7] .............................................. G06K 9/00
(52) U.S. Cl. ..................... 382/100; 382/237; 358/3.06
(58) Field of Search ................... 382/100, 237; 283/72, 113; 358/3.06, 534, 3.28; 380/51, 54; 713/176; 347/131; 399/180, 181; 345/596

(56) References Cited

U.S. PATENT DOCUMENTS

| | | | |
|---|---|---|---|
| 4,405,829 A | 9/1983 | Rivest et al. | 178/22.1 |
| 5,111,310 A | 5/1992 | Parker et al. | 358/456 |
| 5,438,634 A * | 8/1995 | Kumagai | 382/169 |
| 5,488,664 A | 1/1996 | Shamir | 380/54 |
| 5,734,752 A | 3/1998 | Knox | 382/212 |
| 5,917,951 A | 6/1999 | Thompson et al. | 382/237 |
| 6,025,930 A | 2/2000 | Thompson et al. | 358/1.9 |
| 6,064,764 A * | 5/2000 | Bhaskaran et al. | 382/183 |
| 6,088,123 A * | 7/2000 | Adler et al. | 358/3.28 |
| 6,381,371 B1 * | 4/2002 | Epstein et al. | 382/246 |
| 6,522,766 B1 * | 2/2003 | Ratnakar | 382/100 |

OTHER PUBLICATIONS

Fu et al. "Data Hiding for Halftone Images", Proceedings of SPIE–Security and Watermarking of Multimedia Contents II, Jan. 24–26, 2000, pp. 228–236.*

* cited by examiner

Primary Examiner—Brian Werner
Assistant Examiner—Ryan J. Miller
(74) Attorney, Agent, or Firm—Stephen C. Kaufman, Esq.; McGinn & Gibb, PLLC

(57) ABSTRACT

A method (and system) of watermarking a half-toned image, includes grouping pixels of an image into blocks each containing a plurality of pixels, using as many gray levels as there are pixels in a block to halftone the image formed in the same blocks of pixels, based on a data set formed by the gray levels of the blocks of the halftoned image, generating at least one of a digital signature and a compressed version of the image, to form a generated unit, and inserting the generated unit in the halftoned image to form the watermark, by selecting how a predetermined number of pixels in a block are placed in the block.

21 Claims, 5 Drawing Sheets

METHOD AND SYSTEM USING RENORMALIZED PIXELS FOR PUBLIC KEY AND COMPRESSED IMAGES WATERMARKS ON PRINTS

BACKGROUND OF THE INVENTION

1. Field of the Invention

The present invention generally relates to a method and system for watermarking of images as printed with digital printers, and more particularly to a method and system such as printers or other graphical media including screens of various sorts, that can only display a limited number of colors at each pixel.

2. Description of the Related Art

An "imperceptible watermark" (hereafter "watermark" for short), is defined herein as an alteration of the data set which is mostly not perceptible to a human (i.e., the watermark should be (mostly) invisible), but can be recognized by a machine such as a computer. The general principle of such a watermark has been disclosed, for instance, in "Digital Watermarking for High-quality Imaging", by M. M. Yeung, F. C. Mintzer, G. W. Braudaway, and A. R. Rao, *Proceedings of the IEEE Signal Processing Society Multimedia Workshop*, Princeton, N.J., 1997.

In the above-mentioned paper, the emphasis is on computer images and other images where each pixel contains information described by one or more real numbers (i.e., all together 8 or more bits of information per pixel for black and white, and several times this amount for color, depending on the number of basic colors being used, usually 4 to 6).

However, hitherto the present invention, there have been few methods or techniques known for producing a digital watermark which is mostly targeted at prints and other images where each pixel contains information described by one or more small integer numbers, or by one or more rational numbers with a small denominator (i.e., the denominator is smaller than 16; altogether usually 4 or less bits of information per pixel for black and white, and several times this amount for color, depending on the number of basic colors being used, usually 4 to 6).

Hence, when building watermarks for electronic images, one is greatly helped by there being a lot of information per pixel. For example, one can hide the watermarks in the least significant bits at some or all pixels. However, when dealing with digital prints, one loses most of this freedom as there is anywhere from one to a small number (usually at most four) digits of information (per color) per pixel. This problem was solved for instance in "Counterfeit Detection Method" by Turho, Xerox Disclosure Journal Vol. 20 No 6 November/December 1995, in U.S. Pat. No. 5,488,664 to Shamir, and in U.S. Pat. No. 5,734,752 to Knox. Both Shamir and Knox provide methods allowing visual recognition of a watermark by comparing a print to a second print, the second print being printed on a transparent medium. The inventions of Shamir and Knox both use pixel blocks, but in a quite different manner.

That is, Knox also uses pixel blocks, larger than the ones used by Shamir, although this use of pixel blocks is not stated explicitly. More precisely, Knox uses two or more different dithering masks with identical boundaries but different, stochastic, interior parts. The part of a half-toned image where a given mask has been used can be thought of as a "pixel block". It is noted that the methods in Shamir and Knox, of using a transparent medium to visually recognize a watermark, can be used as a way to implement the verification stage of the present invention described below.

However, this implementation would not be very practical as some substantial amount of computation must be performed to verify a public signature, whereas the inventions of Shamir and Knox are aimed at helping in situations only requiring moderate levels of security where less information needs to be checked to accept a document or other object as authentic.

Problems of the conventional techniques to which the present invention is aimed at solving include:

1) For watermarks which are being used for the protection of the integrity and originality of an image, in contexts where high levels of security are required, it is advantageous, for both practicality and increased security, that the watermark be designed using public key cryptography. Part of the problem of using a public key infrastructure (PKI) for images is to find means to stably read information out of the image in order to check a signature.

More precisely, this problem is trivial to anyone versed in the art of cryptography, as long as the image is kept and circulated only in electronic form, as one can then reasonably hope that the information content of the image is invariant in time and predictable from what can be known at the time of the signature.

However, when an image is printed, the information is less stable, and even the problem of recovering the precise content of each pixel is difficult because the image must be perfectly placed on a scanner glass, as the pixels are quite small. A solution to this problem in the case of high quality printed images, as can be provided for instance with offset printing or dye sublimation, is disclosed in U.S. patent application Ser. No. 09/398,203, to G. Aggarwal et al., filed Sep. 17, 1999. The problem which is considered in the present invention is halftoned images, as provided by digital or multitone printers as well as files with similar formats, as described below.

2) When it is desirable to have the precise halftone of a image to be preserved, the halftoned part can be stored and circulated, for instance on the world-wide-web (WWW). Also, with the increasing use of smaller computing devices with limited display capabilities, halftone images have increased room in the new electronic age.

One problem in keeping an image in halftone form is that halftones are hard to compress. It would be advantageous to hide a small copy of a halftoned image in the halftoned image itself. This would allow a user to decide, for example, if the full image is worthwhile receiving using information which needs not be sent again in case the decision is made of receiving the full image.

SUMMARY OF THE INVENTION

In view of the foregoing and other problems, disadvantages, and drawbacks of the conventional methods and structures, an object of the present invention is to provide a method and system for using such watermarks which solve the above-mentioned problems.

Another object is to provide watermarks for digital prints so as to provide the requisite security for authenticating documents.

Below, first, the watermarks solving the above-mentioned problems, will be described assuming that scanning of the printed images can be done very exactly without difficulty. Then, it will be described how to implement the invention to overcome this further difficulty. The present invention will be presented in the context of digital black and white printers. Adaptation to color and multitone would be obvious to anyone versed in the art taking the present application as a whole.

In a first aspect, a method (and system) of watermarking a half-toned image, includes grouping pixels of an image into blocks each containing a plurality of pixels, using as many gray levels as there are pixels in a block to halftone the image formed in the same blocks of pixels, based on a data set formed by the gray levels of the blocks of the halftoned image, generating at least one of a digital signature and a compressed version of the image, to form a generated unit, and inserting the generated unit in the halftoned image to form the watermark, by selecting how a predetermined number of pixels in a block are placed in the block.

In a second aspect, a method of watermarking a digital print, includes reserving a space N0(m,N) in a memory to print a half-toned version of an image, where $1 \leq m \leq H'$ and $1 \leq n \leq V'$, reserving a smaller space for receiving a matrix M(h, v), the smaller space being determined by the size h0-by-v0 of the pixel blocks, determining, based on a size of the pixel blocks, a list of gray levels to be used, the list representing that either $0, 1, 2, \ldots, h0.v0$ pixels can be black in the pixel blocks, using, by a half-toning algorithm, the list of gray levels, and determining the image I={I(i,j)} to be printed, wherein each element I(i,j), with $1 \leq i \leq $ Himage and $1 \leq j \leq $ Vimage, is a gray level g, where g is a real number between 0 and 1.

In a third aspect, a method of embedding a watermark in an image, includes forming a watermark which contains at least one of a digital signature and a small copy of the image, and embedding the watermark in a halftoned image of the image.

In a fourth aspect, a system for watermarking a half-toned image includes means for grouping pixels of an image into blocks each containing a plurality of pixels, means for using as many gray levels as there are pixels in a block to halftone the image formed in the same blocks of pixels, means for, based on a data set formed by the gray levels of the blocks of the halftoned image, generating at least one of a digital signature and a compressed version of the image, to form a generated unit, and means for inserting said generated unit in the halftoned image to form said watermark, by selecting how a predetermined number of pixels in a block are placed in the block.

Further, a program storage medium is provided for storing program steps of the inventive methods.

With the unique and unobvious features of the present invention, a method and system are provided which employ a watermark in a digital print, so as to provide the requisite security for authenticating documents, and regardless of whether the image was scanned correctly or not. The invention also provides means to embed a compressed version of an image in the digital print of the image.

BRIEF DESCRIPTION OF THE DRAWINGS

The foregoing and other objects, aspects and advantages will be better understood from the following detailed description of preferred embodiments of the invention with reference to the drawings, in which.

DESCRIPTION OF THE DETAILED EMBODIMENTS OF THE PRESENT INVENTION

Turning now to FIGS. 1–8, preferred embodiments of the present invention will be described. First, an overview of the invention will be provided.

Watermarks

The present invention is interested in fragile watermarks. Such watermarks are easily removed from an image, and can also be removed accidentally, or simply by processing the image (i.e., by printing it). Such watermarks usually are conceived to allow recognition that an image is authentic and has not been altered. In this context, disclosed below are methods to create fragile watermarks for digital prints which are defined by public key cryptography.

When the presence of fragile watermarks is not made public, such watermarks may also have some virtue in ownership protection as indelicate users may not attempt to remove them from the images they use fraudulently. On the other hand, presented hereinbelow are examples of fragile watermarks which allow simplifying access to documents by revealing the essential content before the whole document is transmitted.

Even with the development of the World-Wide-Web (WWW) and other electronic communications, printed pictures are still in use and can be required for some applications. For instance, assume that a judge in a foreign court requires a copy of a picture of a criminal, kept on file by the Federal Bureau of Investigation (FBI). The picture may be presented to the judge in printed form and it would be convenient to equip the picture with watermarks which would allow recognition that the picture was indeed transmitted by the FBI and that the image has not been transformed in a substantially significant way after being sent (e.g., some pixels may have been printed improperly and such transformations, and only similar ones, should not prevent authentication of the image).

Having watermarks that work on printed half-toned pictures is known to be usable for recognition of documents such as identification documents, and for tickets such as sporting event and entertainment tickets, travel documents, etc. For years, such applications of security were thought of as requiring only moderately secure control methods. However, with the fast increase of computer communication, security has progressed, and subsequently, the number of dishonest hackers able to break security mechanisms has increased as well. Thus, it is more and more necessary, to have some security, so as to rely on well accepted security mechanisms such as the use of Public Key Infrastructures (PKI).

Half-Toning

Most printers today can print in only a limited number of colors. Digital half-toning is a technique for printing a picture (or more generally displaying it on some two-dimensional medium such as a liquid crystal display, etc.) using small dots with a limited number of colors such that it appears to consist of many colors when viewed from a proper distance. For example, a picture of black and white dots can appear to display gray colors when viewed from some distance.

Figure 1:
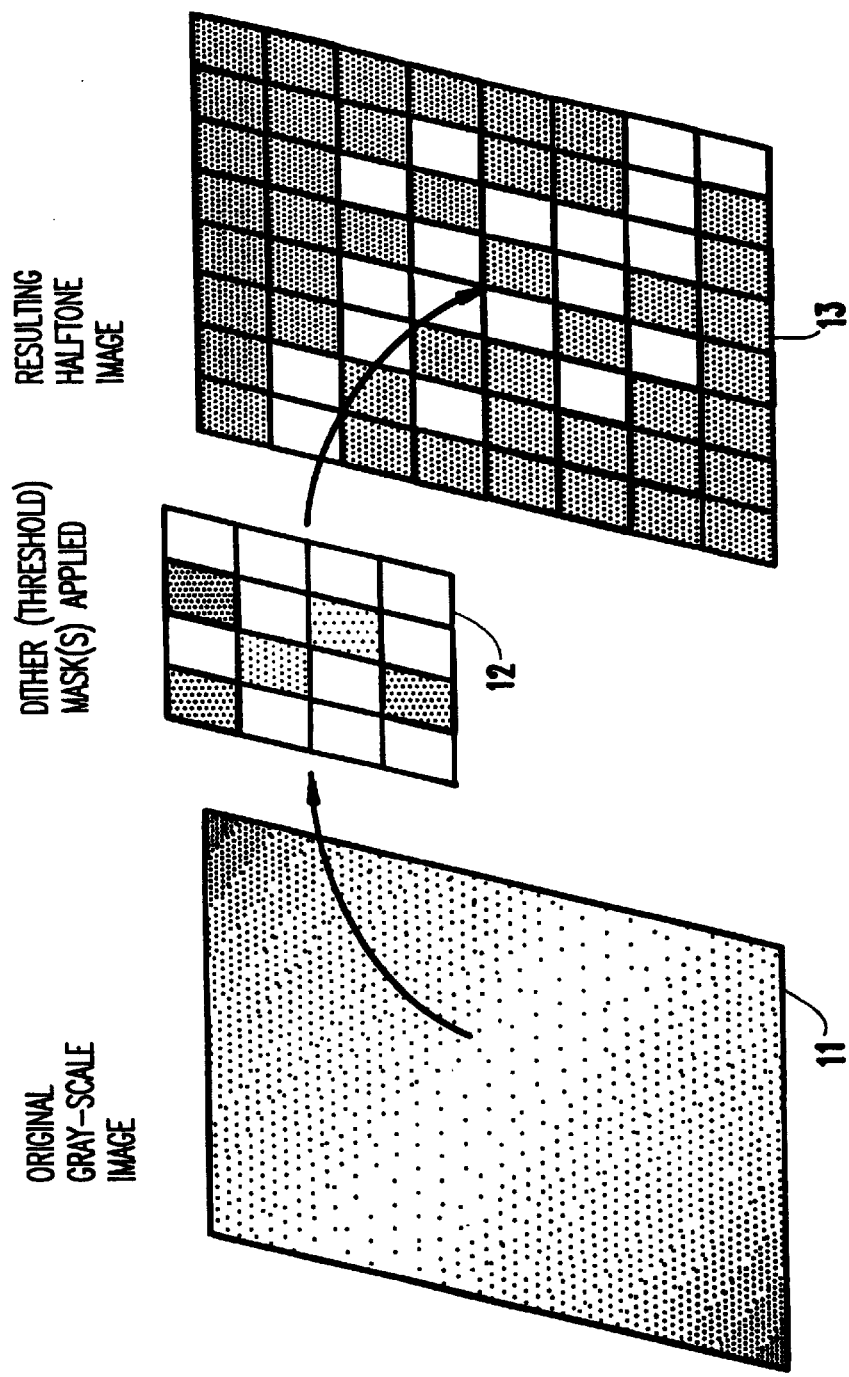
FIG. 1 illustrates the use of dither masks for half-toning, according to the conventional methods.

The fastest and most commonly used methods for digital half-toning are dithering algorithms which use threshold arrays (also called dither matrices or dither masks). The principle of this method, as illustrated by FIG. 1, is well known. The method allows associating a matrix N of discrete values at 13 (e.g., typically 0 or 1, where 1 means a pixel is printed, and a 0 means nothing is printed) to an image I at 11 using a dithering mask 12 (a smaller matrix of threshold values). Various masks can be devised, according to the needs of precise applications, and several methods to devise masks with good performance have been disclosed (e.g., see for instance U.S. Pat. No. 5,111,310 to Parker et al., U.S. Pat. No. 5,917,951 to Thompson et al., and U.S. Pat. No. 6,025,930 to Thompson et al.).

Instead of a dithering mask, one can also use other half-toning algorithms such as error diffusion.

Dithering masks as well as error diffusion can be easily adapted to use more than two possible outputs per pixel (i.e., several levels of gray instead of just black and white). This is referred to as multitone printing (with digital printing then referring to black and white pixels only). Also, all these techniques, can be easily adapted to color printing. Both adaptation to multi-tone and to color (digital or multi-tone color) are well known by anyone versed in the art of digital printing.

The present invention will use some half-toning algorithms, whose choice will depend on the preference of the user. More particularly, any of the methods mentioned so far can be chosen.

Most of these techniques and others are reviewed in the book *Digital Halftoning*, MIT Press, Cambridge, Mass. (1987) by R. Ulichney, which is a general reference for digital half-toning in Black and White. As for color, "Optical Color technology for electronic imaging devices" by Kang, Henry R. (Bellingham, Wash., USA:SPIE Optical, 1997) is a general reference for color digital printing.

Cryptography

The use of Private key/public key pairs (or SK/PK pairs; also referred to as public schemes) as means for encrypting or digitally signing a file or document, of secret encoding keys, and of secure hash functions (such as SHA-1, as fully specified in the Federal Information Processing Standard Publication 180-1) are now well known. A description of these techniques with directions on how to use several of their implementations can be found in "Handbook of applied Cryptography", by Alfred J. Menezes, Paul C. van Oorschot and Scott A. Vanstone, *CRC Press*, 1997.

To fix the ideas, a digital signature scheme is used in the form of a pair of functions Sign and $\text{Sign}^{-1}$ which are an inverse of each other (i.e., for a plain text X to be signed, $\text{Sign}^{-1}(\text{Sign}(X))=X$. The function Sign is kept secret, being known only to some legitimate owner of the signature and his/her agents. The function $\text{Sign}^{-1}$ is known publicly, and accessible for instance through the WWW or through some agency specializing in providing PKI.

As described below, the present invention uses a digital signature scheme to create a watermark.

For definiteness, each time a public scheme is used, one can, for example, utilize the Rivest-Shamir-Adleman (RSA) protocol, described in U.S. Pat. No. 4,405,829, as a method to generate and use a SK/PK pair in order to allow for public encryption or a digital signature. Other methods could also be used (see, e.g., the "Handbook of applied Cryptography").

When the functions Sign and $\text{Sign}^{-1}$ are produced according to the RSA protocol, it is now preferred to use 1024 digits for X and Sign(X) (the formerly used 512 digits are now considered as not being secure any more). Since an image contains typically much more information, several methods can be used, possibly concurrently, as is well known in the art. For instance, one can split the image information content in several pieces, some or all of which will be signed. Alternatively, one can compress the information, for instance using a secure hash function (such as SHA-1 for instance), or one can select a subset of the information, etc.

Clearly, the protocol and public key which are chosen must be known publicly if one desires to use public key cryptography. Also, it is noted that even if one wishes to use the benefits of public key cryptography, it may be useful to also hide secret information in the image, using the present invention, but with a secret key, so that one could recognize that someone has succeeded in breaking the keys being used. As usual in the art, it is advisable to change the keys being used every so often, depending on the application, and to keep a list of former keys.

Further, the present invention, transformed in a way which would be trivial to anyone versed in the art after taking the present application as a whole, can be used to embed in the image, some information about the date at which the image has been signed, and other useful information, depending on the application.

Hereinbelow will be described watermarks which solve the problems of the conventional techniques and systems.

First, the watermarks solving these problems, will be described assuming that scanning of the printed images can be done very exactly without difficulty. Then, it will be described how to implement the invention to overcome this further difficulty. As mentioned above, the invention will be presented in the context of digital black and white printers, but of course adaptation to color and multitone would be obvious to anyone versed in the art within the purview of the present application.

First, some notations are defined as follows. For example, the image to be printed will be denoted as the matrix I={I(i, j)}, where 1≦i≦Himage and 1≦j≦Vimage. Each element I(i, j) of I is a real number between 0 and 1, where "0" means "white" and "1" means "black". Further, it is assumed that the printer will print H' pixels in the horizontal direction, and V' pixels in the vertical direction.

As it is now possible to get, at very low price, printers at very high resolution (e.g., 1200 dots per inch and above), a key idea of the present invention is to sacrifice some of this high resolution to hide the information in block pixels, using the idea of "block renaming" (first formulated for the theory of renormalization as developed in statistical mechanics and dynamical systems, and well known in these sciences).

More specifically, a pixel block will be a small, predetermined-size rectangle with h0 pixels in the horizontal direction, and v0 pixels in the vertical direction. Thus, the printer will print:

H=H'/h0 pixel blocks in the horizontal direction, and
V=V'/v0 pixel blocks in the vertical direction.

Given these numbers, a new image I' is computed out of I by covering I with a grid of size H-by-V, and then averaging the gray levels on the little rectangles defined by the grid. Thus, the new image I'={I'(h, v)} has H columns and V rows, i.e., $1 \leq u \leq H$ and $1 \leq v \leq V$.

Given the new image I', a half-toned version M={M(u, v)} of it will be computed using some preferred half-toning engine, which uses one or a plurality of half-toning algorithms such as dithering masks and error diffusion. The entries of M belong to the set of gray levels which can be realized by pixel blocks.

Thus, there are h0.v0 basic gray values and the multi-tone half-toning algorithm must be chosen-accordingly. In particular, M also has H columns and V rows. It is noted that the pixels to be printed are not determined at this stage. That is, only the pixel blocks are determined and there remains some freedom with which to hide the watermark. The information contained in M (or some part of this information specified once and for all (e.g., the elements with u+v equal to an even number)), can then be used to compute a digital signature. Such a signature can be thought of as a long sequence of 0s and 1s. To hide this signature in the image, one can use the fact that a pixel block with average gray level g with 0<g<1 can be printed in more than one way.

That is, one of the ways will be chosen to represent a 0, and another one to represent a 1. Thus, the pixel blocks which are neither all white nor all black will carry the digital signature. Once the signature has thus been incorporated in the image, all pixels are determined, which defines a half-toned image N={N(m, n)}, with $1 \leq m \leq H'$ and $1 \leq n \leq V'$.

Instead of a digital signature, one can also hide a small version of the image. For instance, one can create an image with less information by averaging over big blocks which would cover matrix M. This averaging defines a matrix with rational number entries, which can then be half-toned using some second preferred half-toning engine which yields a "small matrix" SM of 0s and 1s. For example, small matrix SM can be hidden in matrix M as described above for the digital signature.

It is noted that one can use parts of M to hide the digital signature, and other parts to hide the small copies SM of M. The public signature can indeed be used to sign SM. When the signature of SM is hidden in half-toned image N, and later recovered from N, its inverse can then be checked against small matrix SM, whether SM has been hidden in N or the method to compute SM given matrix M is known.

To stabilize the reading (i.e., to obtain a similar reading of M each time one tries to read a print by using a scanner), one must overcome the problem of the small size of the pixels. Even if one uses a very high resolution scanner, there are still problems of:

1) a leaf of printed paper will seldom be put twice on the scanner in the same way, and that:
2) with some digital printers, it is impossible to predict exactly where all pixels will be printed (even if one knows half-toned image N), because of the physical process used in the printer.

The first problem could be solved, for example, by printing some distinguishing signs which can then be taken as references for the placement of the rest of the picture. However, this would not solve the harder second problem.

To solve both problems at the same time, one can again use a renormalization idea and use blocks of pixel blocks as coding units. More precisely, one covers the half-toned image N with a h2-by-v2 grid, where h2 is a multiple of h0, and v2 a multiple of v0, and all pixels of any rectangle of the new grid will carry the same code (if any). In such a case, one will assign a code to a rectangle if and only if it contains enough pixel blocks which are neither 0 nor 1 (e.g., half of the pixel blocks in the rectangle).

Furthermore, it is noted that several splitting of grids into smaller rectangles will be used. It is unnecessary to assume that the number of pixels on the image in the horizontal and vertical directions are multiples of the horizontal and vertical sizes of the smaller rectangle. If they are not, the remaining pixels on the left and the bottom of the image will not be treated according to the invention.

It is also noted that, while the invention is described in the case the image is covered by rectangular blocks of pixels, other shapes allowing to tile the plane, such as hexagons or triangles, would allow readily adapting the invention, as would be clear to anyone versed in the art.

Figure 2:
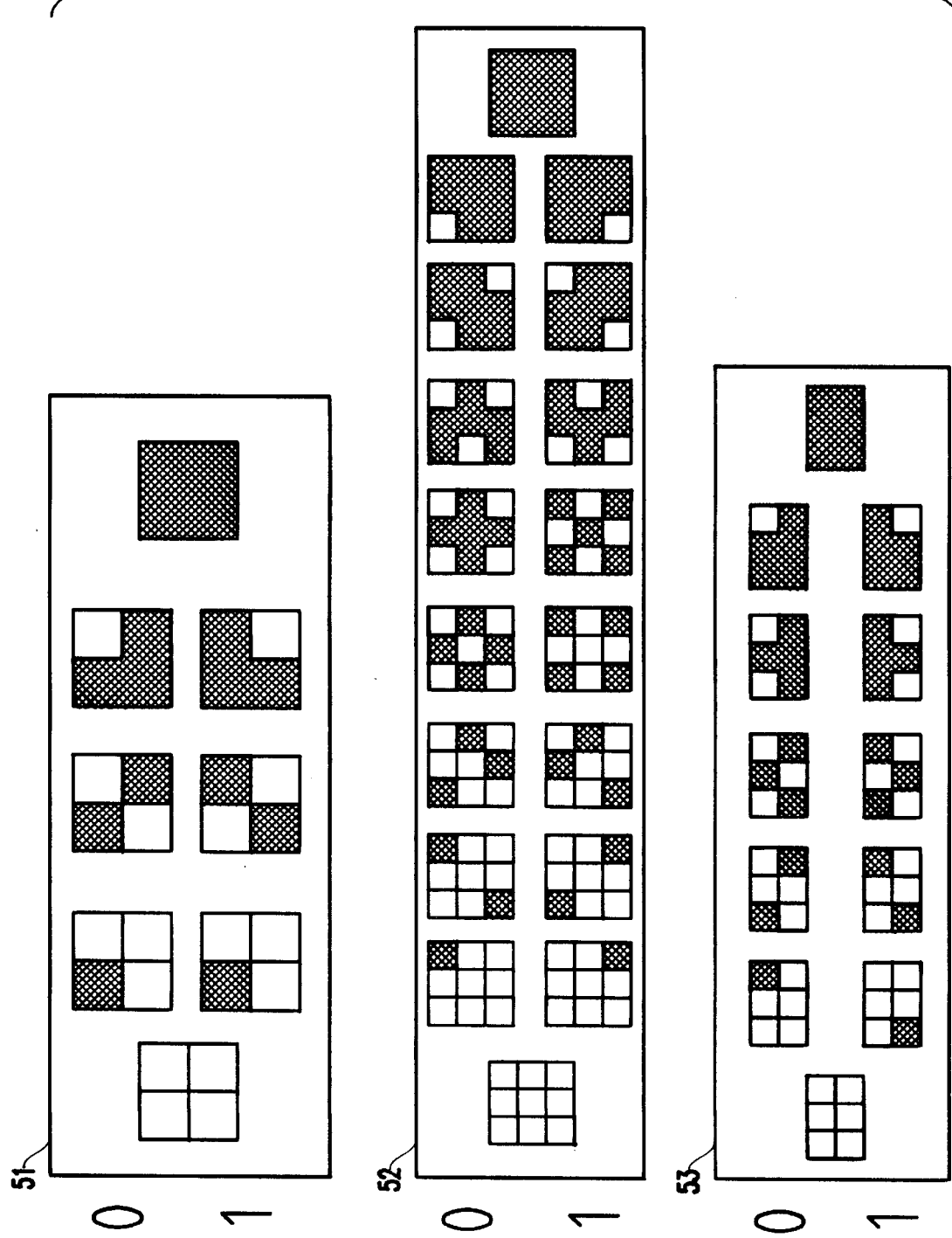
FIG. 2 shows various ways gray levels different from 0 and 1 can be realized by pixels blocks of size h0-by-v0, and how this can be used to create pixels blocks which represent 0 and 1.

Referring now to the drawings, and more particularly to FIG. 2, some examples of gray levels representations are provided by pixel blocks of size h0 by v0, with h0=v0=2 at 51, h0=v0=3 at 52, and h0=3 and v0=2 at 53. For any gray level different from 0 and 1, there are at least two representations for that gray level, one of which can be used to represent a symbol "0" while another one can be used to represent "1".

It is noted that for some gray levels, there might be a preferred representation. For example, at reference numeral 52, the two representations of ⅕ in the second column could be replaced by a configuration with a single black square in the middle of the 3-by-3 square. If such single preferred patterns are used, this will diminish the number of gray levels that can carry the watermark.

Figure 3:
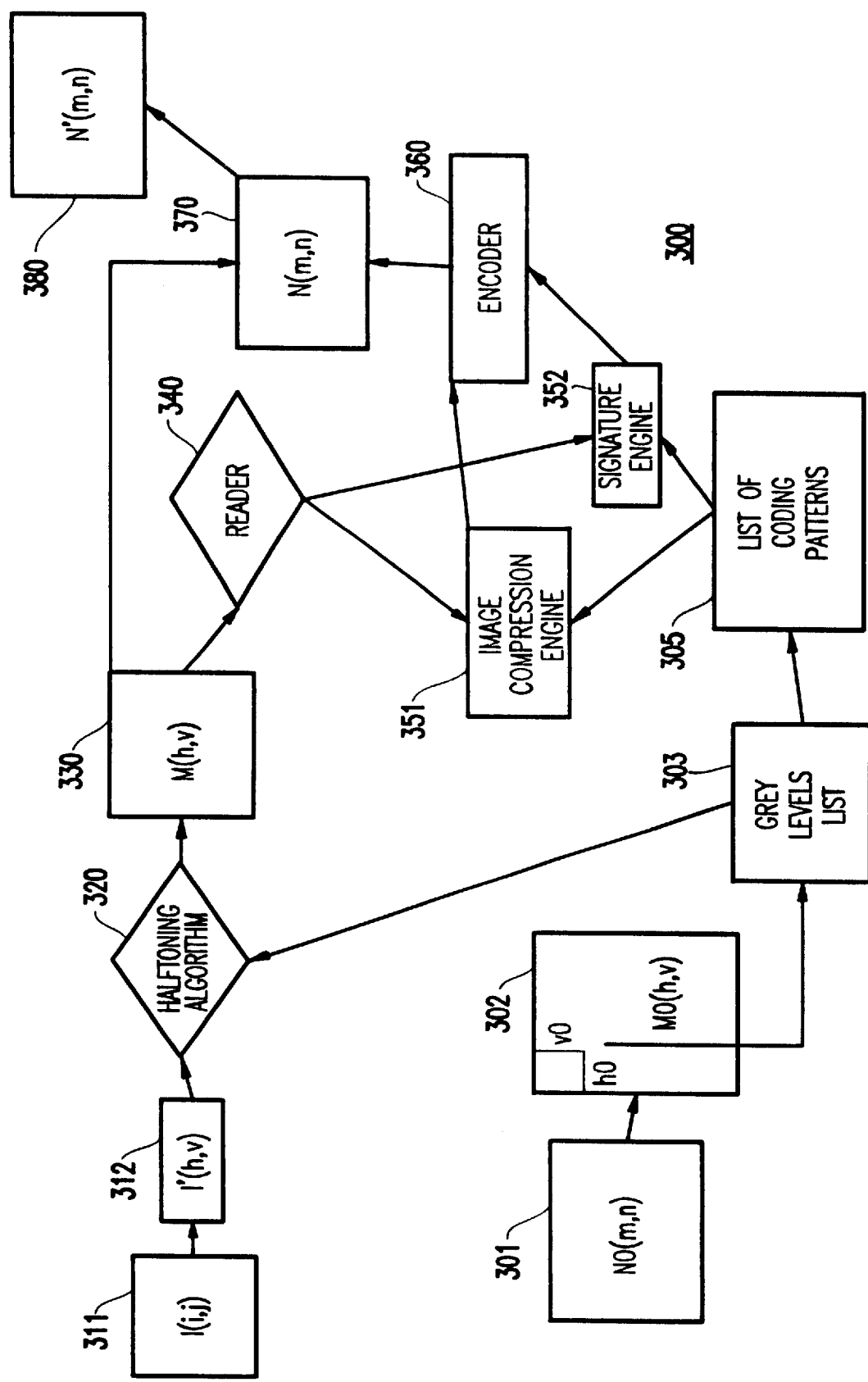
FIG. 3 shows a flow diagram of a method 300 according to the present invention.

Turning to FIG. 3, a method 300 is shown which represents a way of implementing the present invention.

First, in step 301, it is noted that N0(m, l) where $1 \leq m \leq H'$ and $1 \leq n \leq V'$, represents the space reserved in the memory of a computer to print the half-toned version of an image.

Then, in step 302, a smaller space is reserved which will receive the matrix M(h, v) to be defined later. This smaller space is determined by the size h0-by-v0 of the pixel blocks, as represented at reference numeral 302.

The size of the pixel blocks then determines the list of gray levels to be used at reference numeral 303. This list represents the fact that either 0,1, 2, . . . , h0.v0 pixels can be black in the pixel blocks. One can either simply use the proportion of black pixels to determine the gray level, or take account of the shape of the pixels being printed, and use theoretical corrected black coverage (i.e., using actual pixel shapes, which are mostly unpredictable, would not allow proper and most advantageous implementation of the present invention). The list of gray level will be used by the chosen half-toning algorithm at 320.

The image I={I(i,j)} to be printed is determined at 311. The size of this image is not critical (e.g., say Himage-by-Vimage). It is assumed that each element I(i, j), with $1 \leq i \leq Himage$ and $1 \leq j \leq Vimage$, is a gray level g, where g is a real number between 0 and 1, although in some cases I may be a half-toned image ( i.e., then, in some cases, the recourse to the half-toning algorithm at 320 will not be used).

Further, the image I is covered by a H-by-V grid at step 311

Then, gray levels are averaged over all rectangles of that grid to define the new image I'={I'(h, v)} with $1 \leq h \leq H$ and $1 \leq v \leq V$. It is noted that even if I is a physical image which must be scanned before the rest of the processing occurs, it is more practical to think of I' as a matrix.

Matrix I' at 312 is processed at 320 by some preferred half-toning algorithm, for example, a dithering mask or error diffusion, which depends on the list of gray values at 303. This generates half-toned matrix M at 330.

At 340, matrix M is interpreted as a data stream, and optionally (selectively) cut into a plurality of pieces (some of which can overlap). These pieces can, for instance, form blocks, not necessarily all of the same size (the blocks may have the same size or may have a different size depending upon the ease versus generality desired by the designer), that cover M, or can correspond to intertwined parts of M. Some of the pieces may be processed in an image compression engine at 351, one example of which will be described in more detail below. Other pieces may be processed at 352 by a digital signature scheme such as for instance the RSA scheme.

At reference numeral 351, similarly to at reference numeral 352 of the signature engine, a sequence of zeros and ones is produced. These sequences are transformed at encoder 360 into choices of the pixel blocks, from FIG. 2 for instance, that are stored at reference numeral 305.

Then, these choices are imposed on matrix M to form matrix N at 370. The information coming from a part of M can be signed in a signature to be placed in the same part or a subset of that part as taught in U.S. Pat. No. 6,256,736 A entitled "Secured Signal Modification and Verification with Privacy Control" by D. Coppersmith, F. Mintzer, C. Tresser, C. W. Wu, and M. M. Yeung, incorporated herein by reference.

Once half-toned image N has been computed, using a digital printer one can produce a printed version N' 380 of N, which may differ from N by the fact that some pixels may print badly.

Figure 4:
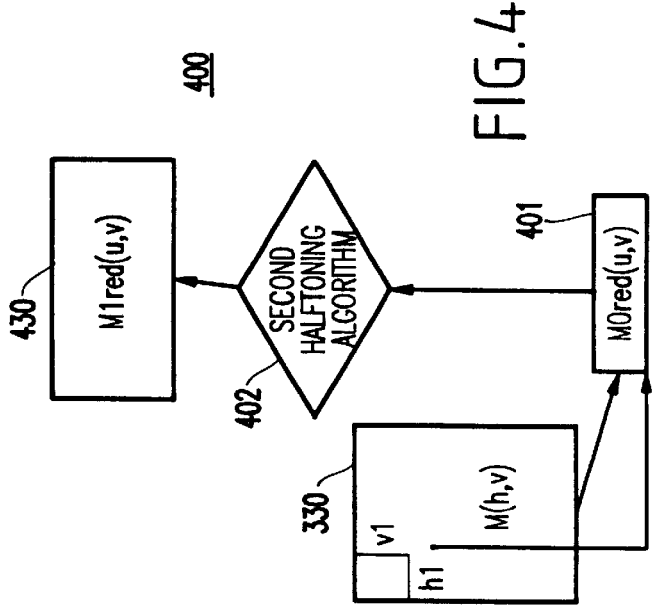
FIG. 4 shows a flow diagram of a particular image compression method 400 that can be used in a preferred embodiment of the present invention.
Figure 8:
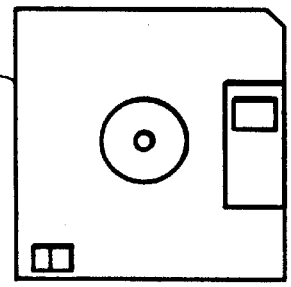
FIG. 8 illustrates a signal bearing medium 800 (e.g., storage medium) for storing steps of a program of a method according to the present invention.

Referring now to FIG. 4, a method 400 is shown for how blocks of size h1-by-v1 of matrix M at 330 (e.g., see FIG. 3) are averaged to form first reduced image M0red at 401.

This image is half-toned at reference numeral 402 using some second preferred half-toning algorithm which generates matrices of 0s and 1s (to the contrary of the algorithm at 320 which generates more possible values (more precisely h0 times v0 values) at each point).

The half-toned image M1red at 430 will be transmitted to encoder 360 as shown in FIG. 3.

Figure 5:
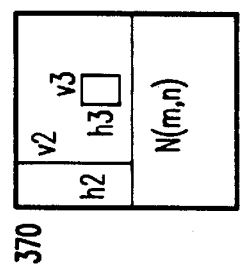
FIG. 5 shows how to partition the half-toned image into blocks of pixel blocks of size h2-by-v2, and how to select sub-blocks of those of size h3-by-v3.

Referring now to FIG. 5, it shown that blocks of pixels blocks of size h2-by-v2 or super-blocks (i.e., a "super block" being a block of blocks) will be used to cover the halftoned image N(m,n).

In each super-block, an inside super-block of size h3-by-v3 will be determined. When inputting the digital signature or compressed image into M to form half-toned image N, it is more convenient to use the same symbol in a full super-block, thus used as a unit of coding information, rather than in a single pixel block. This allows for a reading of the code much less sensitive to rectification.

To further this property, when reading a print N', one reads the codes in the pixel blocks which are in the inside super-blocks. Only super-blocks with enough pixel blocks, which are neither white nor black, will be used to carry the code.

Figure 6:
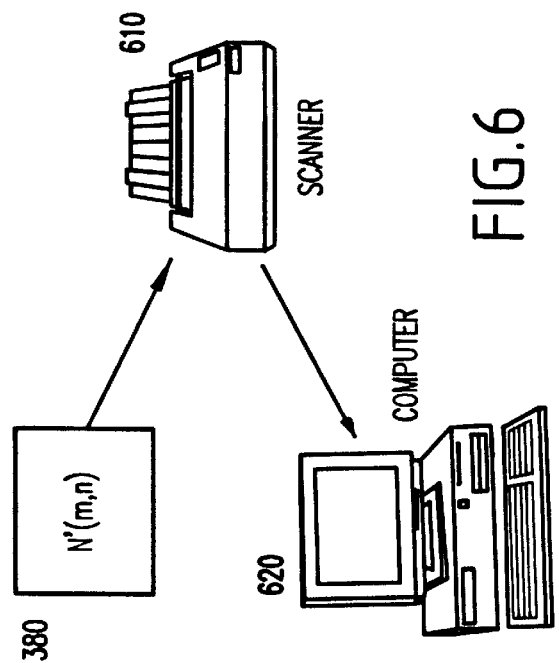
FIG. 6 shows how to implement the verification of a print using a scanner and a computer.

Referring now to FIG. 6, at the time of verification of N', a scanner at 610 will be used to access all pixels in the inside super-blocks to gather the signature.

It is noted that when the image is carried on a small-sized support such as a ticket for a sporting event, movie, transportation, etc., the scanner can be a hand-held device, which can also have enough computing power to dispense of the computer at 620. Ambiguities on the super-blocks having too much white or black will only amount to a few extra cases to be computed.

For example, one can decide that any super-block with at least x % (e.g., x %=30%; it is noted that x can be any number as selected by the designer according to the designer's constraints and requirements) of pixel blocks neither white nor black in the inside super-block will be used for coding, when building N.

When reading N', some super-blocks may have close to x % pixel blocks that are white or black. It is assumed that 1024 digits are used for an RSA signature, as presently required for security against factorization attacks. Possibly, 10 super-blocks come close to x % of black and white (thus about 0.1% of the super-blocks are problematic). Here, "close" means for instance that the percentage of black and white pixel blocks is between (x−y) % and (x+y) % (e.g., y can be fixed to 10 or the like).

Then, all combinations of cases when one of these super-blocks must be used when reading the signature or not have to be considered, so that there are $2^{10}$ cases to be considered.

In each case, one reads the signature and computes its inverse, and authentication of printed image N' will be decided if one of the inverse signatures can be checked as authentic. x can be varied to a range where less super-blocks are problematic, and the value of y can be reduced by using printers with more predictable and/or reproducible performances.

Once the signature is recovered, one can invert it using computer 620 (which, as mentioned above, may be incorporated in the scanning device, the whole apparatus having either a desktop form or a hand-held weight and form factor).

Assuming for instance that a compressed version of the image is what has been signed, one can then check that the inverse of the signature is a compressed version of what is seen as N'. To facilitate the comparison, the compressed version of half-toned image N or matrix M may have been hidden in N as another piece of watermark, according to the method described previously. One may prefer to sign some hash of matrix M or half-toned image N, but this is inconvenient as precise reading of matrix M or N is difficult, if not impossible, when starting from an actual print N'. It is much easier when dealing only with computer data, as well known in the art.

Figure 7:
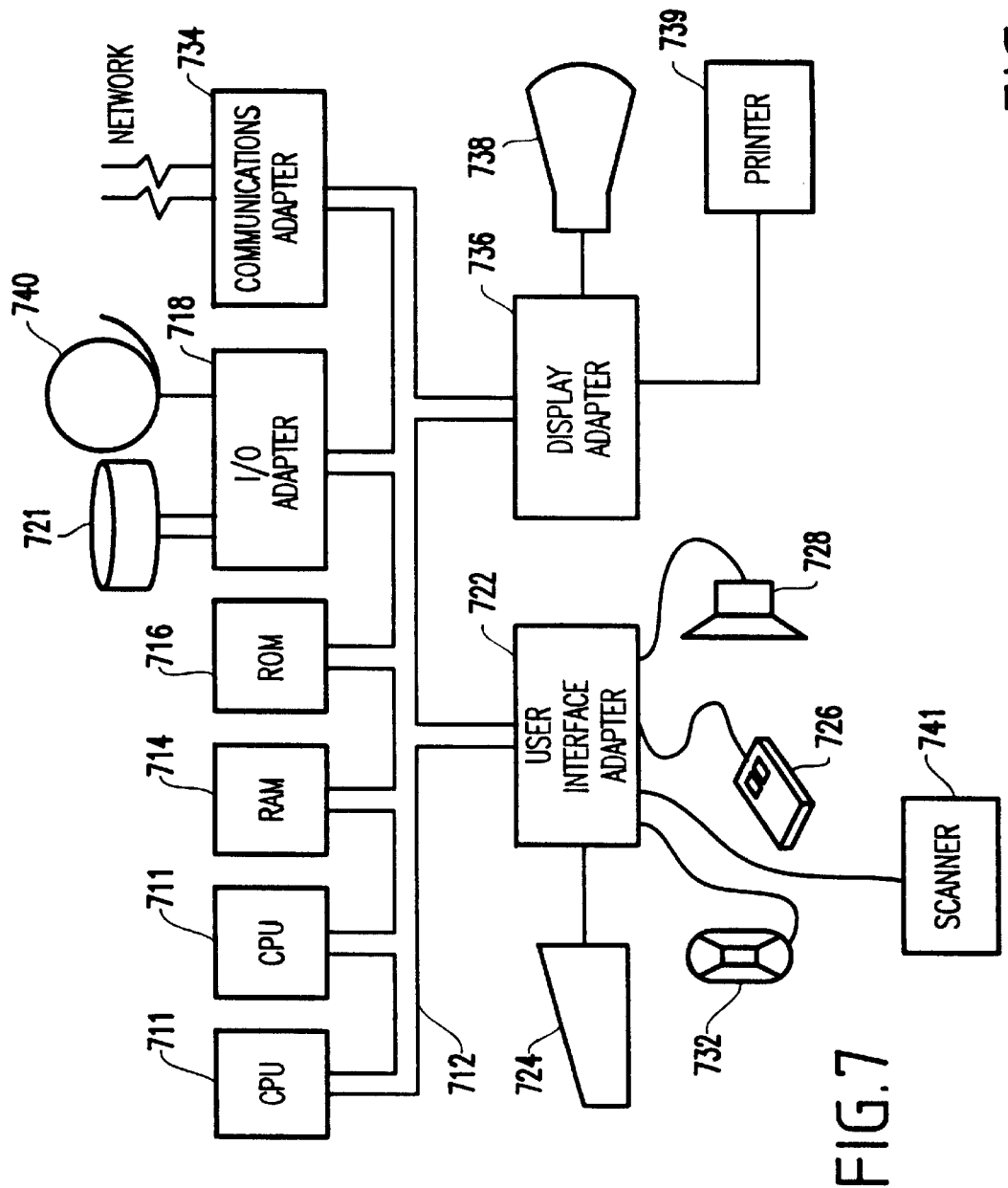
FIG. 7 illustrates an exemplary hardware/information handling system 700 for incorporating the present invention therein.

FIG. 7 illustrates a typical hardware configuration of an information handling/computer system in accordance with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739. As mentioned above, the printer 739 may be a digital printer or the like. A separate, hand-held scanner 741 is also shown, but as mentioned above, the scanner itself may be provided with the processing capability and the like.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious aspects of the present invention, a method and system are provided for using watermarks in digital prints so as to provide the requisite security for authenticating documents. The invention can provide and use watermarks for authenticating prints with the scanning of the printed images being performed either very exactly without difficulty, or very poorly. Thus, the invention can be implemented to overcome a poor scanning.

While a preferred embodiment of the present invention has been described above, it should be understood that it has been provided as an example only. Thus, those skilled in the art will recognize that the invention can be practiced with modification within the spirit and scope of the appended claims.

Having thus described my invention, what I claim as new and desire to secure by Letters Patent is as follows:

1. A method of watermarking a halftoned image which is neither all black nor all white, said method comprising:

grouping pixels of an image into blocks of pixels each containing a plurality of pixels;

using as many gray levels as there are pixels in a block to define a collection of grey levels usable when halftoning the image with effective pixels chosen as said blocks of pixels;

halftoning the image formed of the same blocks of pixels, choosing from said collection of grey levels to decide a grey level of the blocks of pixels of the halftoned image;

based on a data set formed by the gray levels of the blocks of the halftoned image, generating at least one of a digital signature and a compressed version of the halftoned image, to form a generated unit; and inserting said generated unit in the halftoned image to form said watermark, by selecting how the pixels in a block of the halftoned image, the number of which corresponds to a decided grey level, are placed in the block.

2. The method of claim 1, wherein said image comprises a printed image.

3. The method of claim 1, wherein several blocks of pixels are grouped to carry each digit of the digital signature or the compressed image.

4. The method of claim 1, further comprising:

facilitating transmission of the image by extracting a smaller version of the image from part of the data stream which forms the image.

5. The method of claim 1, wherein said blocks each have a same size.

6. The method of claim 1, wherein at least one of said blocks has a different size from others of said blocks.

7. The method of claim 1, wherein said watermark comprises a fragile watermark.

8. The method of claim 1, wherein said pixel block comprises a predetermined, small-size rectangle with h0 pixels in the horizontal direction, and v0 pixels in the vertical direction.

9. The method of claim 8, further comprising:

computing a new image I' from said image by covering the image with a grid of size H-by-V; and averaging the gray levels on predetermined portions defined by the grid, such that the new image I'={I'(h, v)} has H columns and V rows and $1 \leq u \leq H$ and $1 \leq v \leq V$.

10. The method of claim 9, further comprising:

computing a halftoned version M={M(u, v)} of the new image I' using a halftoning engine, wherein entries of M belong to a set of gray levels realized by pixel blocks.

11. The method of claim 10, wherein version M comprises a matrix having H columns and V rows, wherein information contained in M is for computing the digital signature; and wherein the digital signature is hidden in the image by selectively using a pixel block and printing thereof with average gray level g with $0 \leq g \leq 1$.

12. The method of claim 8, wherein with the digital signature or the compressed image incorporated in the image, all pixels are determined, thereby defining a halftoned image N={N(m, n)}, with $1 \leq m \leq H'$ and $1 \leq n \leq V'$.

13. The method of claim 10, further comprising:

embedding said compressed version of the image by averaging over predetermined-size blocks which cover matrix M, said averaging defining a matrix for being halftoned thereby yielding a smaller matrix SM, said smaller matrix being hidden in matrix M.

14. The method of claim 13, wherein a part of matrix M is used for hiding the digital signature, and another part is used to hide the compressed version SM of the image.

15. The method of claim 12, further comprising:

covering the halftoned image N with a h2-by-v2 grid, where h2 comprises a multiple of h0, and v2 comprises a multiple of v0, and all pixels of any rectangle of the new grid will carry a same code; and assigning a code to a rectangle only if it contains a predetermined amount of pixel blocks which are neither 0 nor 1.

16. The method of claim 1, wherein said generated unit is inserted into blocks of the halftoned image which are neither all black nor all white.

17. A method of embedding a watermark in a halftoned image, comprising:

forming a watermark based on a data set formed by gray levels of blocks of the halftoned image which contains at least one of a digital signature and a all copy of the image; and embedding said watermark in said halftoned image by selecting how the pixels in a block of the halftoned image are placed in the block, said halftoned image being neither all black nor all white.

18. A system for watermarking a halftoned image which is neither all black nor all white, said system comprising:

means for grouping pixels of an image into blocks each containing a plurality of pixels;

means for using as many gray levels as there are pixels in a block to halftone the image formed in the same blocks of pixels;

means for, based on a data set formed by the gray levels of the blocks of the halftoned image, generating at least one of a digital signature and a compressed version of the image, to form a generated unit; and means for inserting said generated unit in the halftoned image to form said watermark, by selecting how the pixels in a block of the halftoned image are placed in the block.

19. A system for embedding a watermark in a halftoned image, comprising:

means for forming a watermark based on the data set formed by gray levels of blocks of the halftoned image which contains at least one of a digital signature and a small copy of the image; and means for embedding said watermark in said halftoned image by selecting how the pixels in a block of the halftoned image are placed in the block, said halftoned image being neither all black nor all white.

20. A signal-bearing medium tangibly embodying a program of machine-readable instructions executable by a digital processing apparatus to perform a method of watermarking a halftoned image which is neither all black nor all white, said method comprising:

grouping pixels of an image into blocks each containing a plurality of pixels;

using as many gray levels as there are pixels in a block to halftone the image formed in the same blocks of pixels;

based on a data set formed by the gray levels of the blocks of the halftoned image, generating at least one of a digital signature and a compressed version of the image, to form a generated unit; and inserting said generated unit in the halftoned image to form said watermark by selecting how the pixels in a block of the halftoned image are placed in the block.

21. A signal-bearing medium tangibly embodying program of machine-readable instructions executable by a digital processing apparatus to perform a method of embedding a watermark in a halftoned image, said method comprising:

forming a watermark based on data set formed by gray levels of blocks of the halftoned image which contains at least one of a digital signature and a small copy of the image; and embedding said watermark in said halftoned image by selecting how the pixels in a block of the halftoned image are placed in the block, said halftoned image being neither all black nor all white.

* * * * *